United States Patent
Faber et al.

(10) Patent No.: US 6,254,162 B1
(45) Date of Patent: Jul. 3, 2001

(54) STOWABLE CARGO RESTRAINING WALLED ENCLOSURE ASSEMBLY AND METHOD

(76) Inventors: Michael W. Faber, 833 Abbie St.; Michael P. Podkomorka, 857 Abbie St., both of Pleasanton, CA (US) 94566

( * ) Notice: Subject to any disclaimer, the term of this patent is extended or adjusted under 35 U.S.C. 154(b) by 0 days.

(21) Appl. No.: 09/414,713

(22) Filed: Oct. 8, 1999

(51) Int. Cl.$^7$ .................................................. B60R 11/00
(52) U.S. Cl. ...................... 296/39.2; 296/37.5; 296/37.6; 224/539; 224/497
(58) Field of Search .................................... 296/39.2, 37.6, 296/37.5; 410/121, 129, 140; 224/497, 403, 404, 402, 498, 502, 542, 539, 556

(56) References Cited

U.S. PATENT DOCUMENTS

| | | |
|---|---|---|
| 4,222,695 | 9/1980 | Sarides . |
| 4,875,730 * | 10/1989 | Justice ................................. 296/37.6 |
| 5,131,709 | 7/1992 | Spica . |
| 5,366,124 * | 11/1994 | Dearborn, IV ...................... 296/37.6 |
| 5,456,514 * | 10/1995 | Justice ................................. 296/39.2 |
| 5,464,264 * | 11/1995 | Wilson ................................ 296/37.6 |
| 5,549,428 | 8/1996 | Yeatts . |
| 5,570,921 | 11/1996 | Brooker . |
| 5,597,193 * | 1/1997 | Conner ................................ 296/37.6 |
| 5,599,055 | 2/1997 | Brown . |
| 5,615,922 | 4/1997 | Blanchard . |
| 5,655,863 | 8/1997 | Mundt . |
| 5,673,956 | 10/1997 | Emery . |
| 5,685,593 | 11/1997 | O'Connor . |
| 5,722,710 | 3/1998 | Falciani . |
| 5,743,589 * | 4/1998 | Felker ................................. 296/37.6 |
| 5,788,309 | 8/1998 | Emery et al. . |
| 5,788,310 | 8/1998 | McKee . |
| 5,803,531 | 9/1998 | Nielsen . |
| 6,015,178 * | 1/2000 | Haack ................................. 296/39.2 |
| 6,135,527 | 10/2000 | Bily . |

\* cited by examiner

*Primary Examiner*—D. Glenn Dayoan
*Assistant Examiner*—Greg Blankenship
(74) *Attorney, Agent, or Firm*—Flehr Hohbach Test; Albritton & Herbert LLP

(57) ABSTRACT

A stowable cargo restraining enclosure assembly (10, 110) for restraining cargo (20) in a cargo space (30) of a transport vehicle (40). The enclosure assembly preferably includes a bed liner structure (70, 170) that may be positioned on the bed (50, 150) of the cargo space and at least one enclosure assembly that includes a plurality of sidewalls (80A, 80B, 90A, 90B, 180A, 180B, 190A, 190B) which are pivoted and/or folded into a collapsed or stowed condition in the bed liner (50, 150). During use, the enclosure assembly (10, 110) is pivoted up into the cargo space (30) and the sidewalls deployed to cooperatively form a walled enclosure for cargo. A transport vehicle (40) having the cargo restraining enclosure assembly (10, 110) and a method of restraining cargo in a transport vehicle also are disclosed.

15 Claims, 10 Drawing Sheets

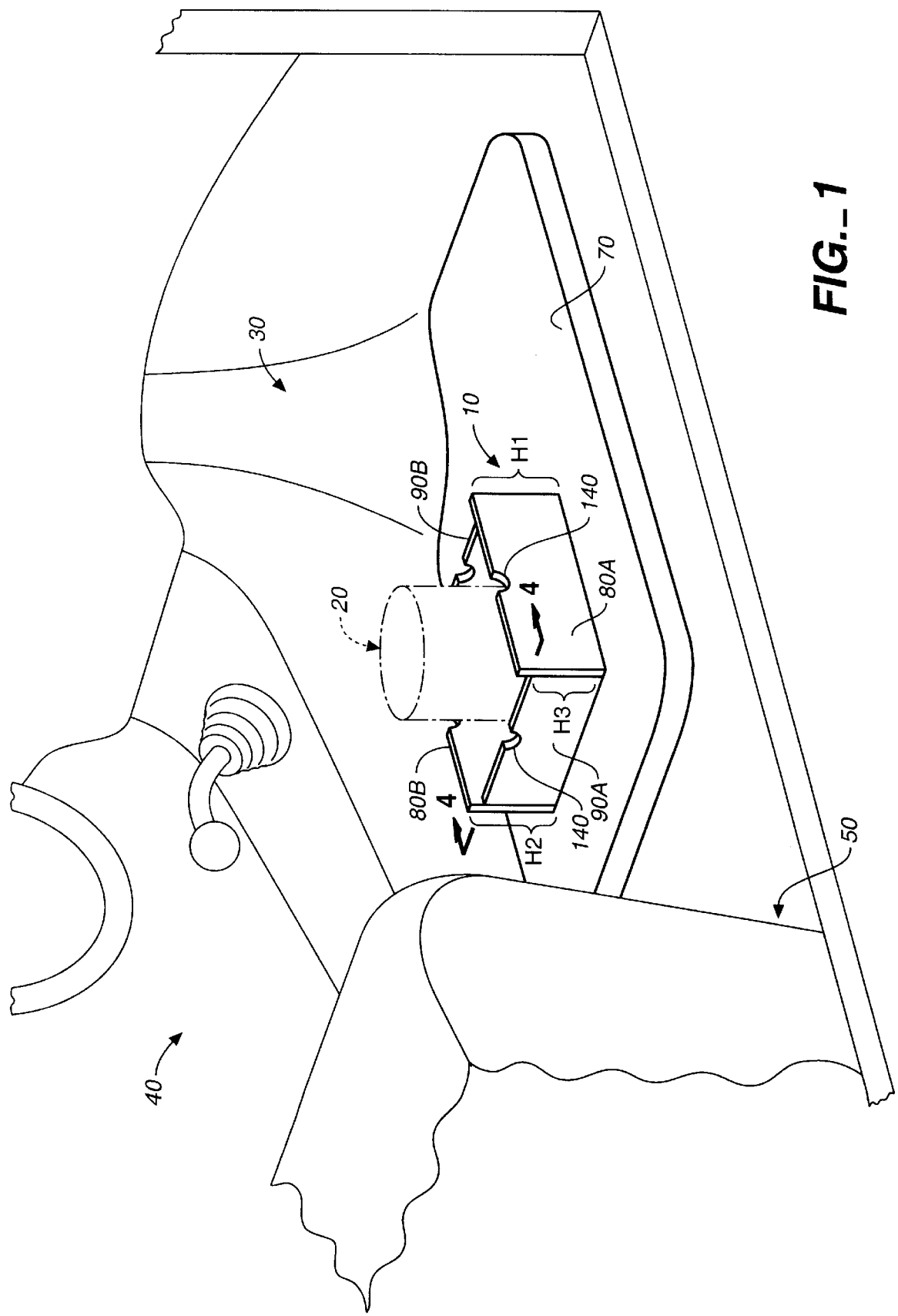
FIG._1

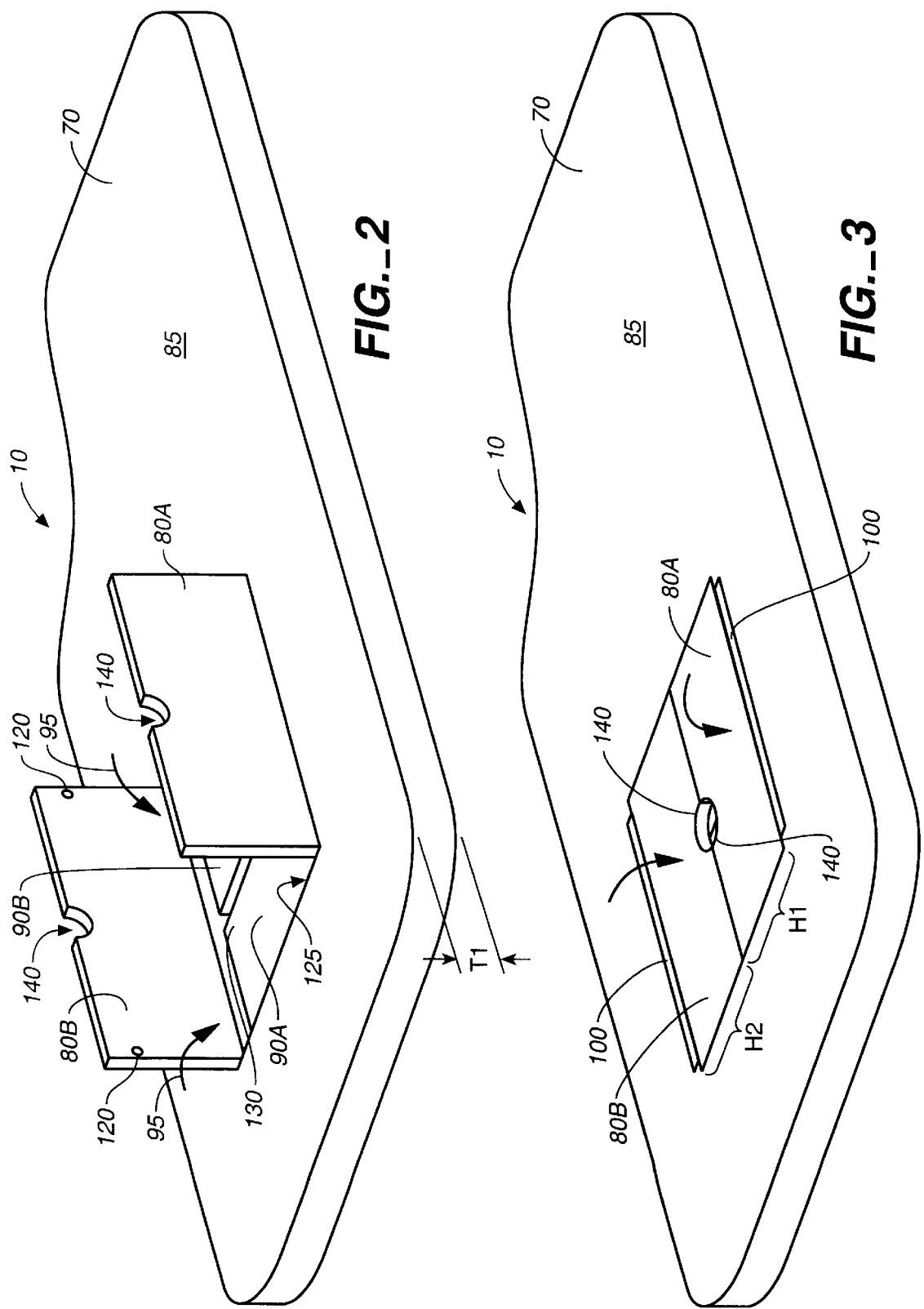

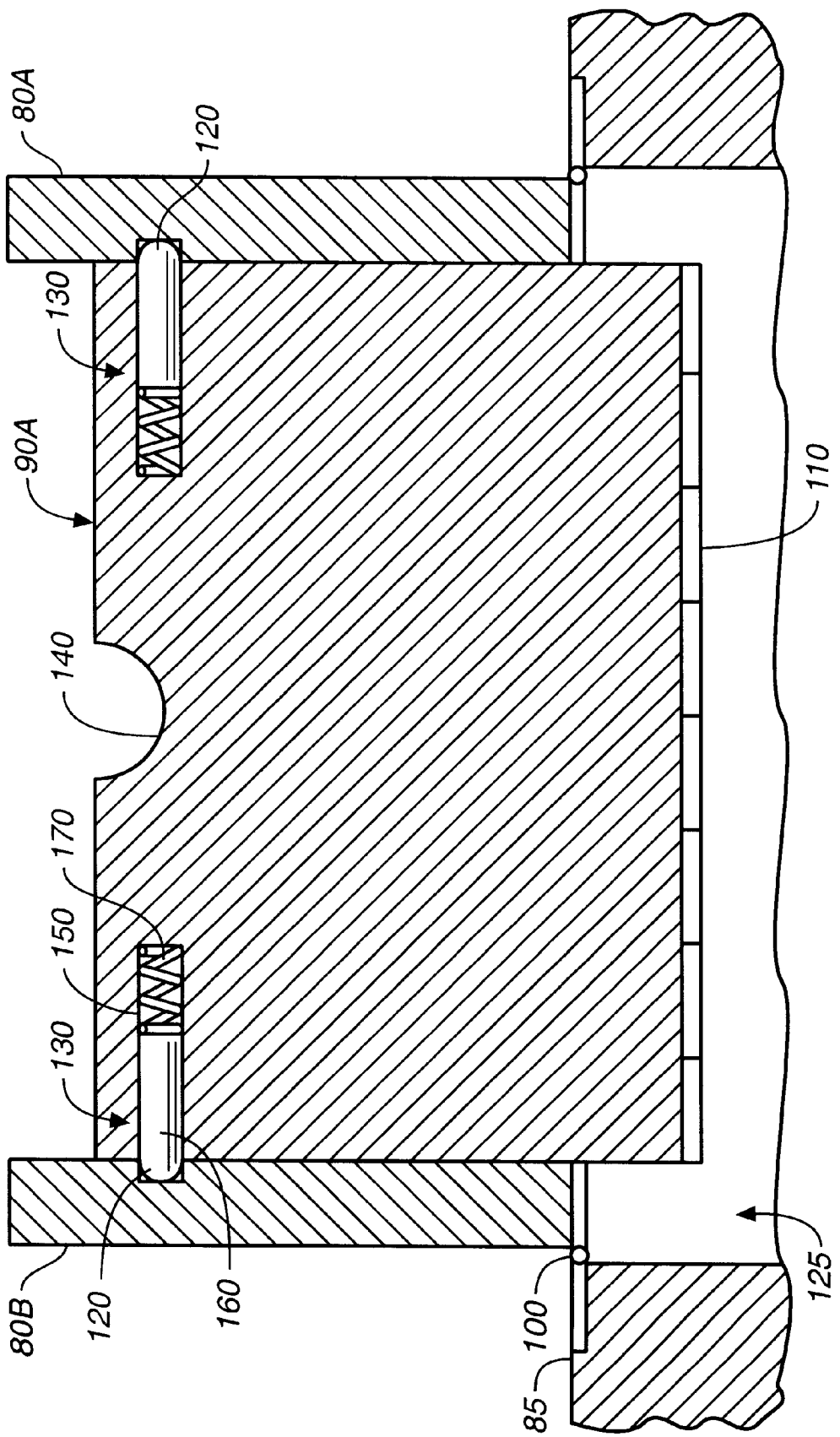
FIG._4

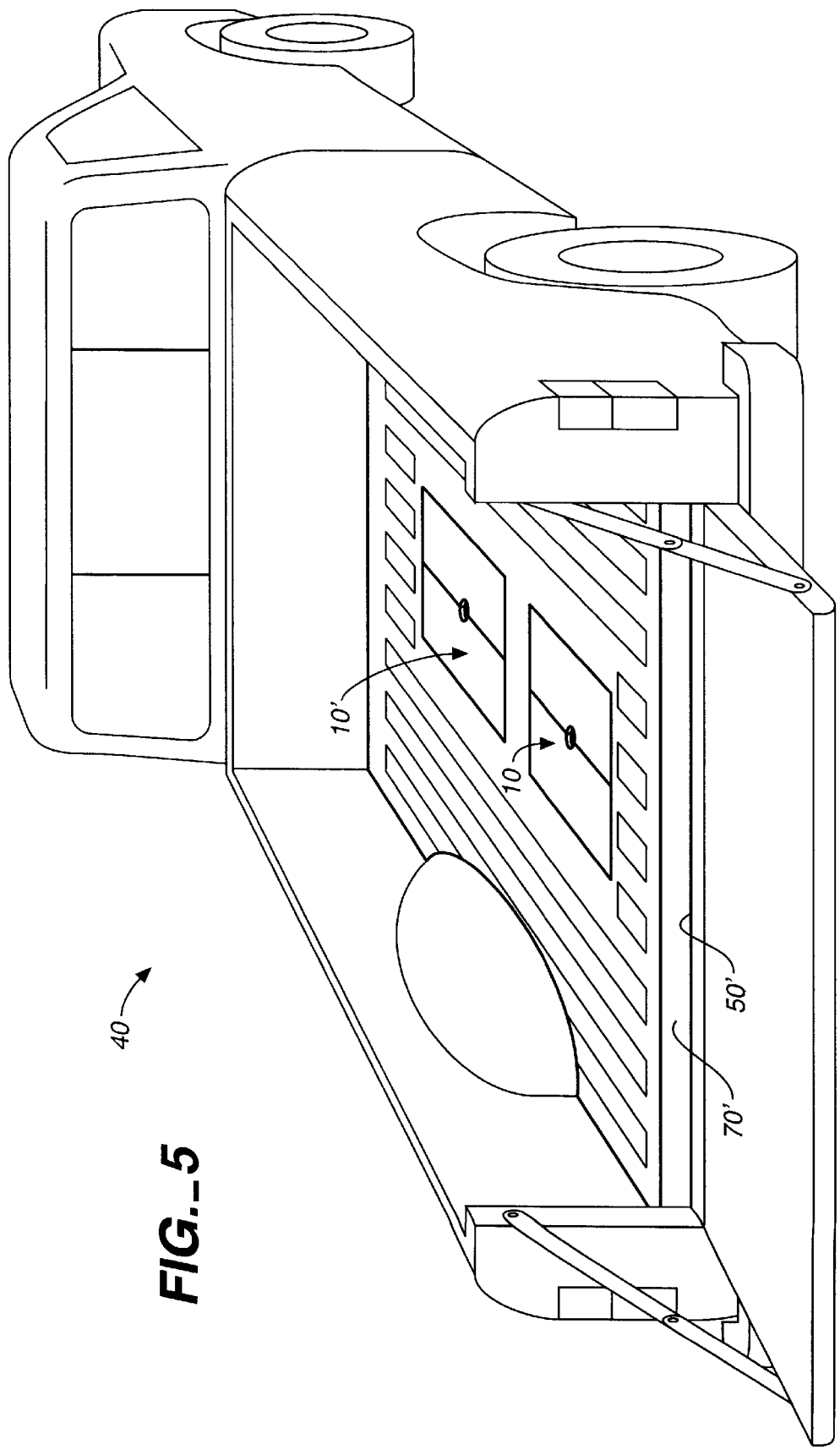

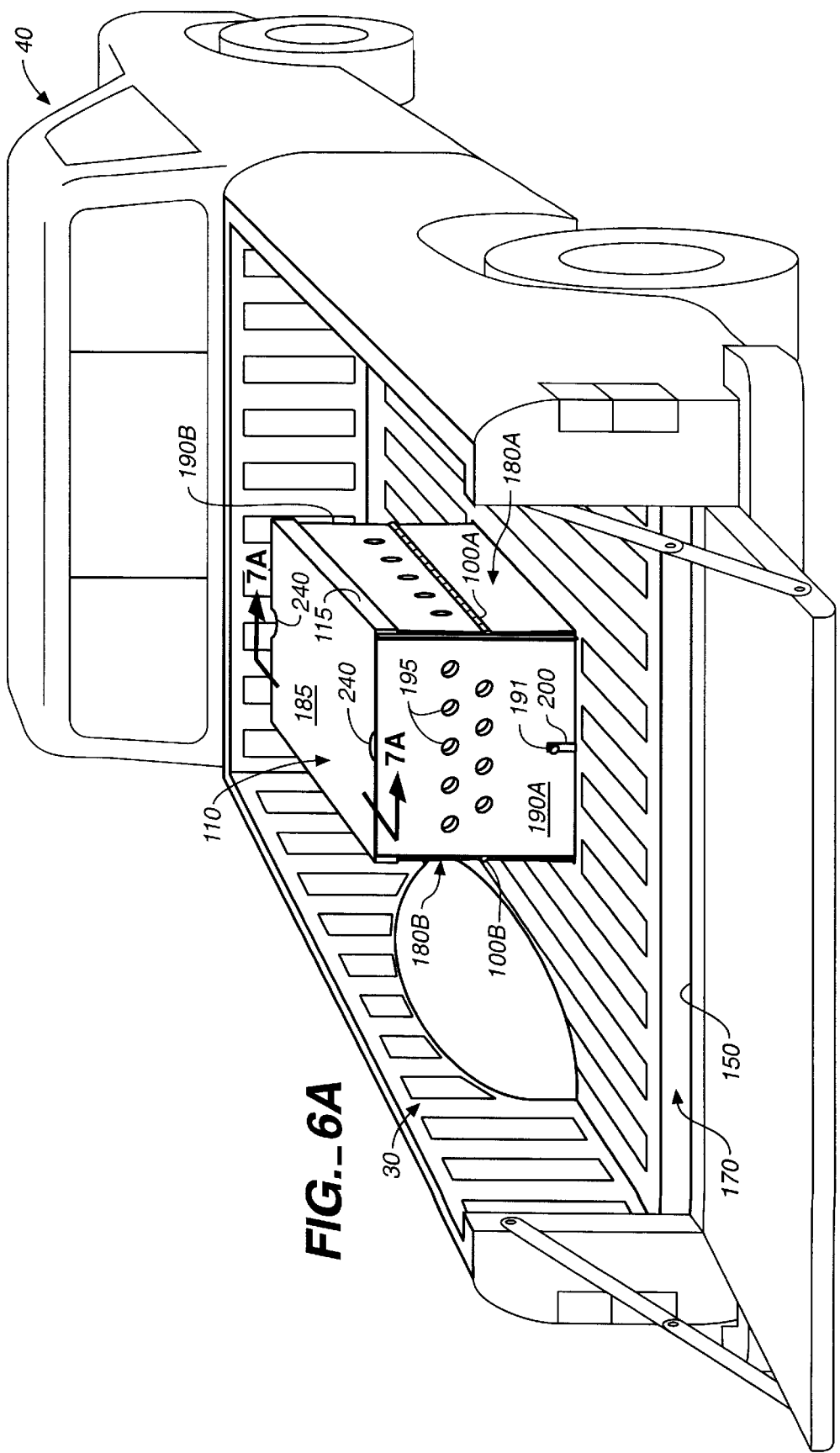

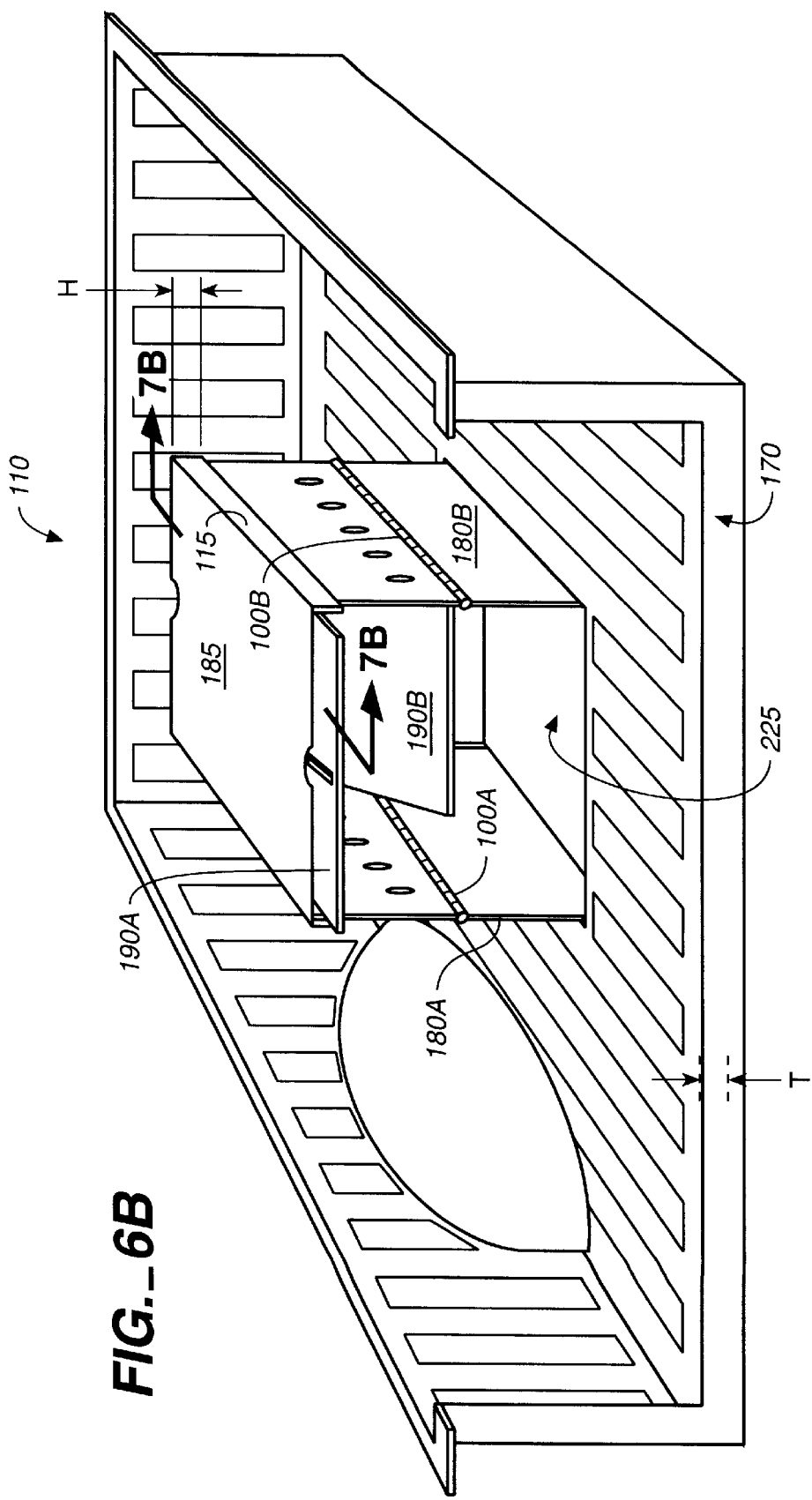
FIG._6B

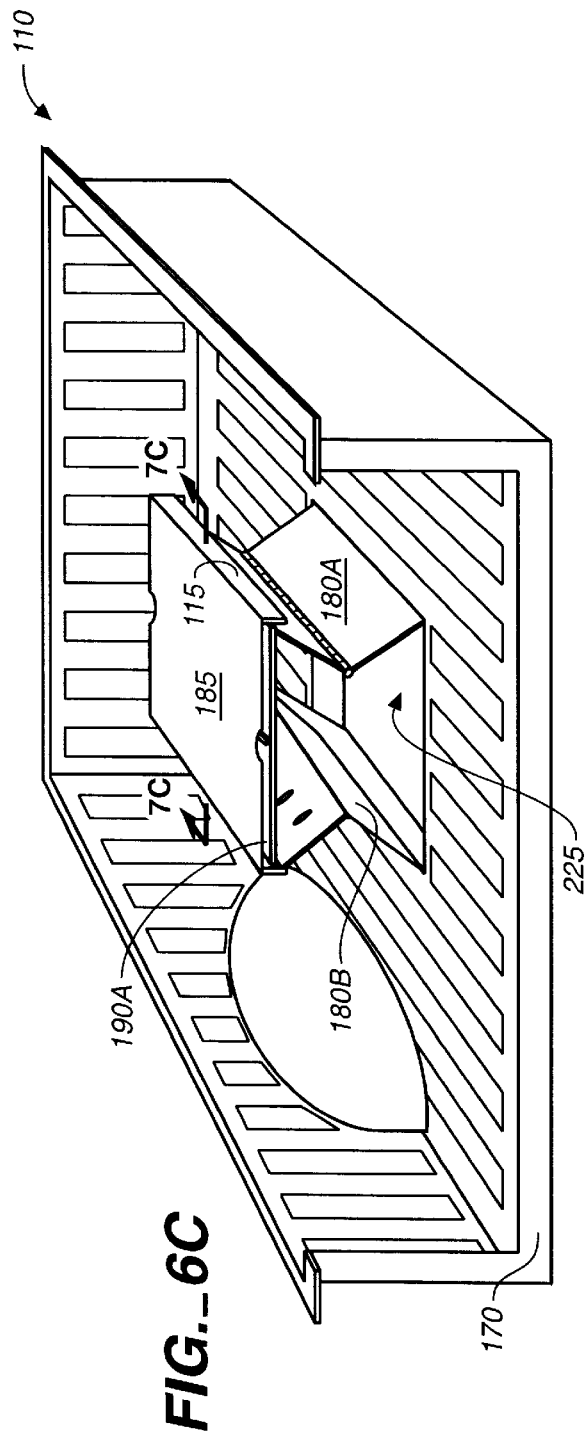
FIG._6C
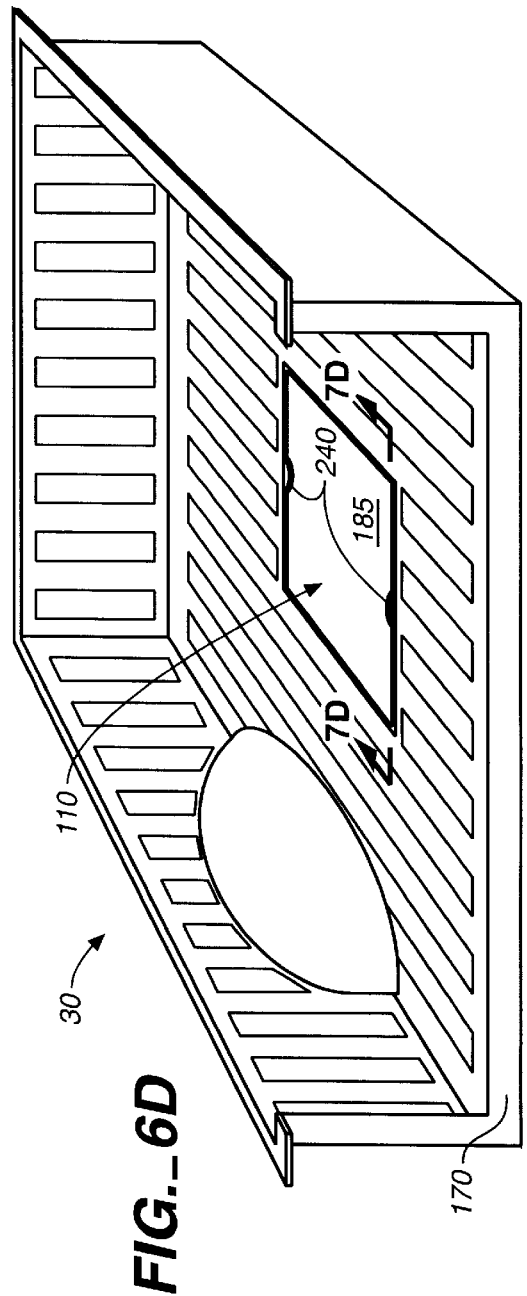
FIG._6D

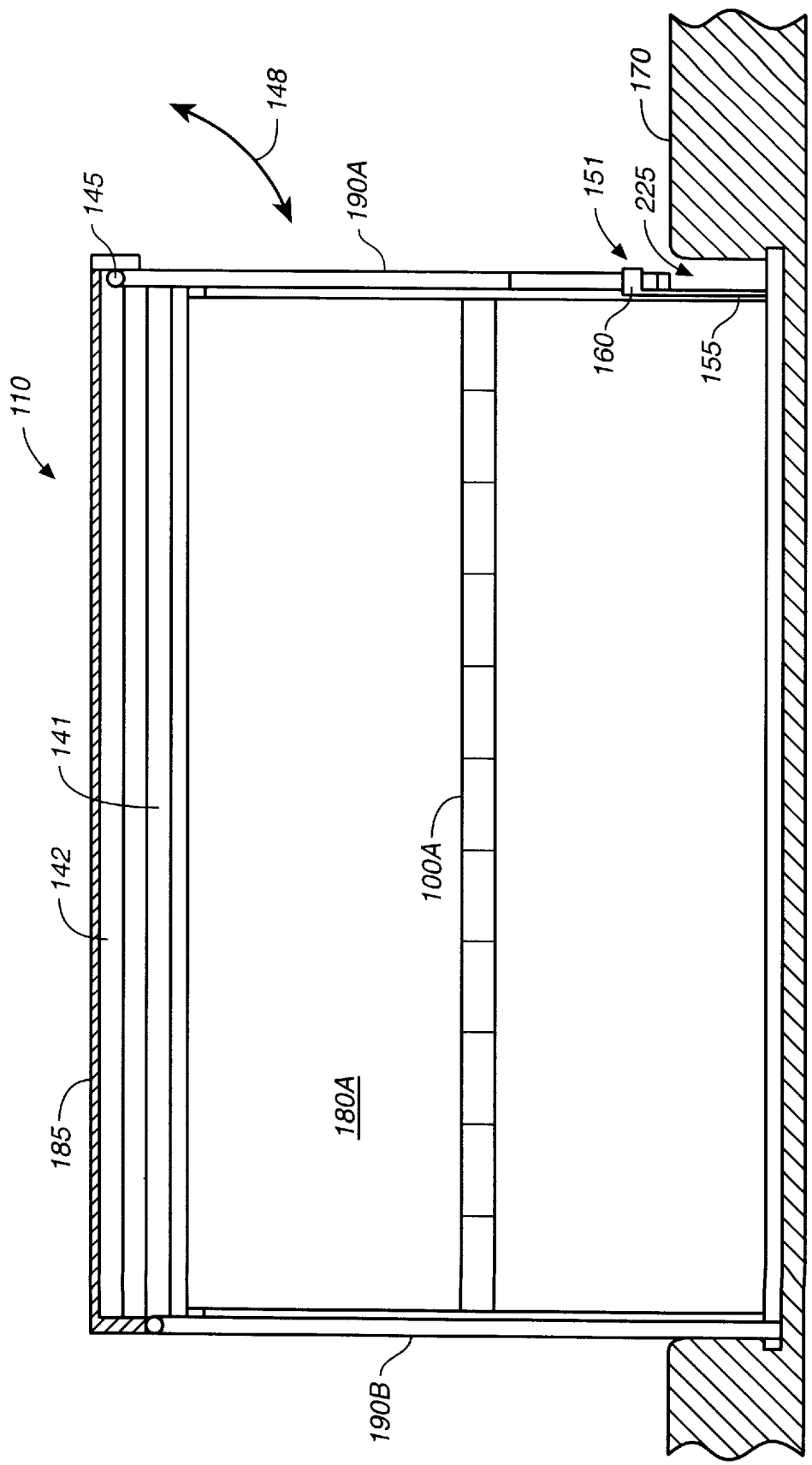
FIG._7A

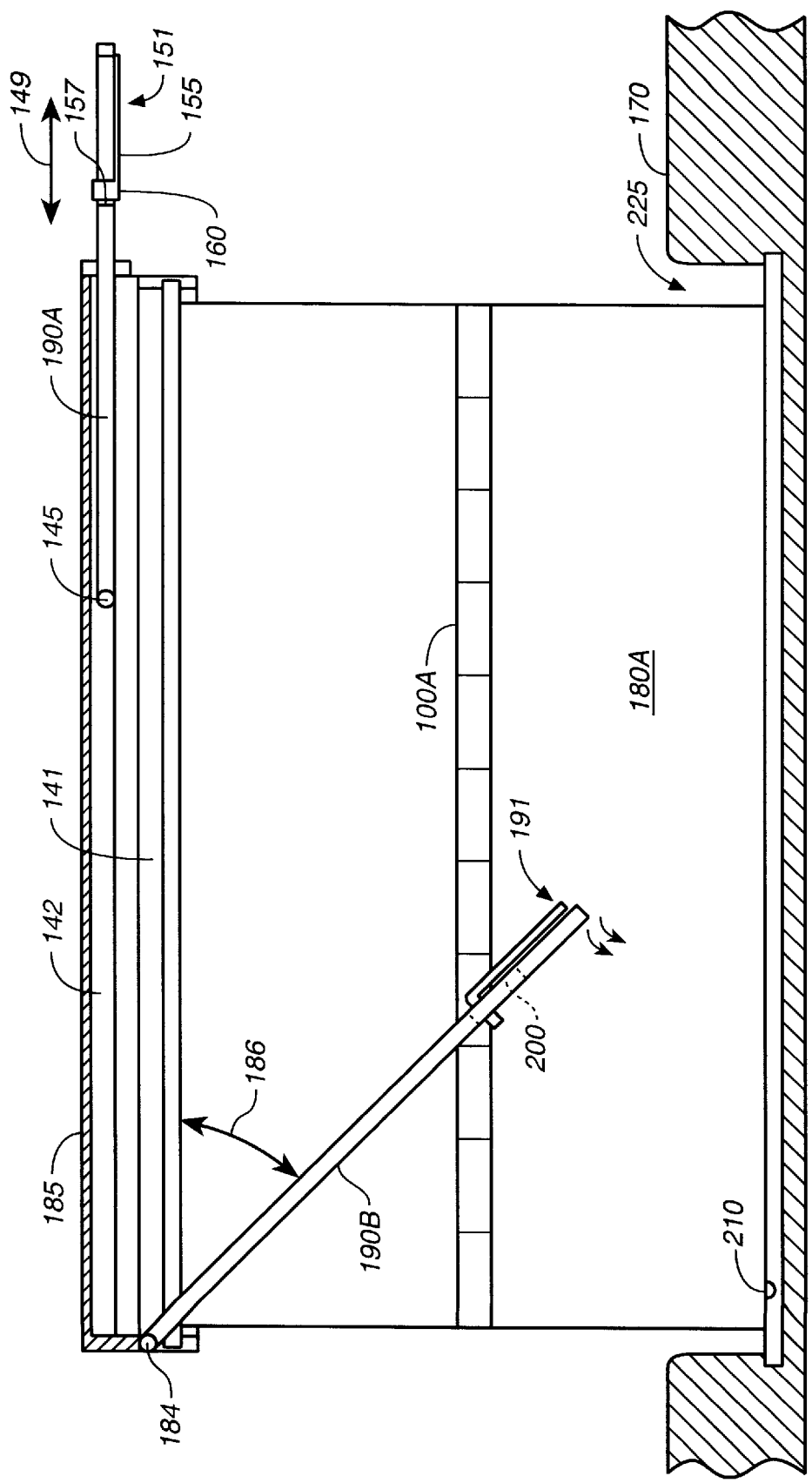
FIG._7B

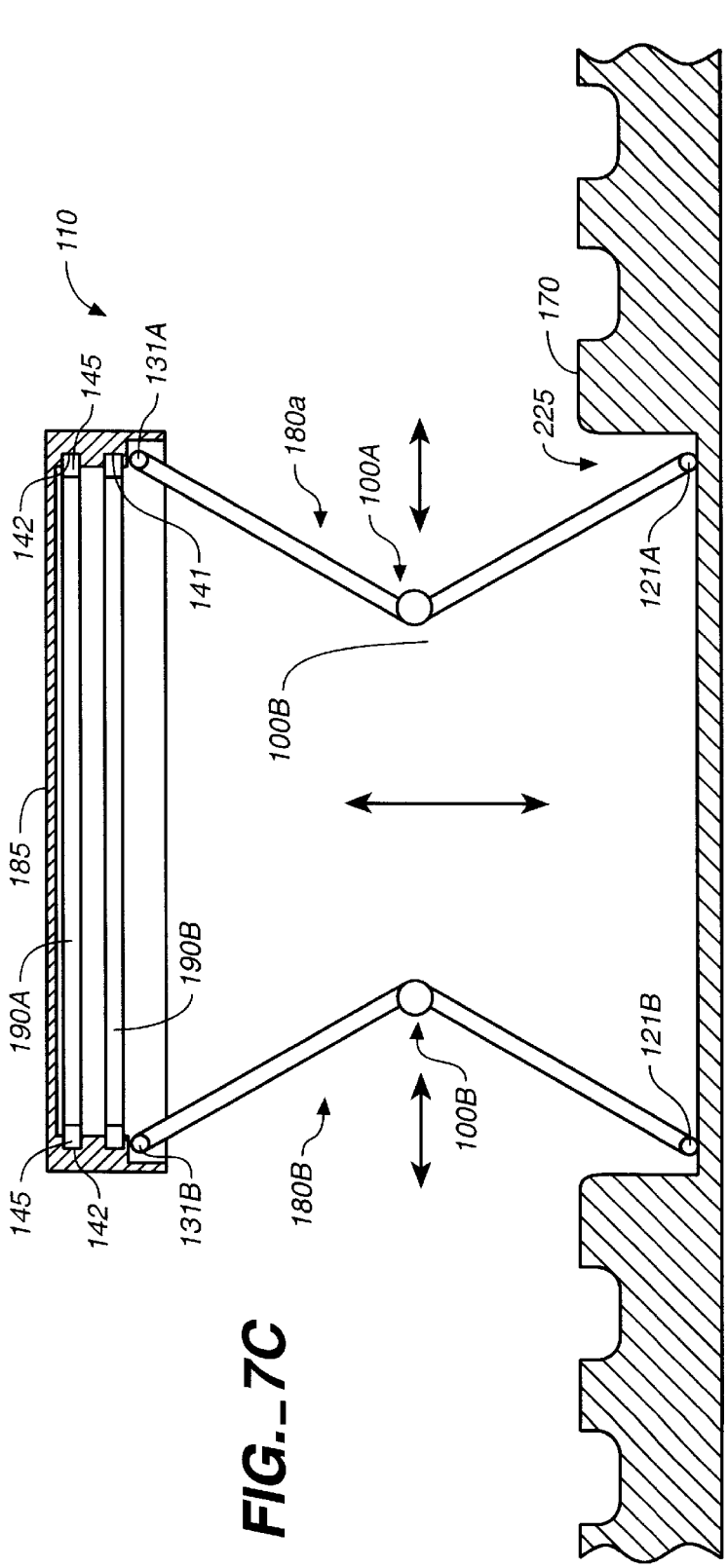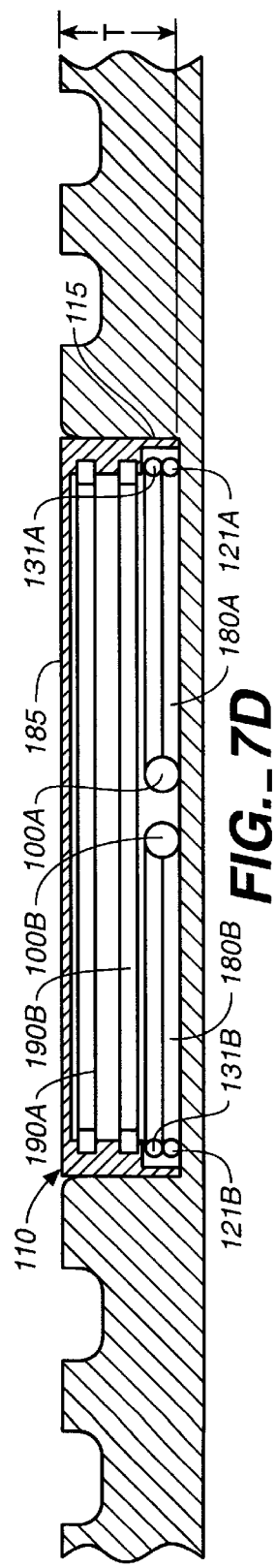

STOWABLE CARGO RESTRAINING WALLED ENCLOSURE ASSEMBLY AND METHOD

TECHNICAL FIELD

The present invention relates, in general, to assemblies and methods for restraining cargo movement in transport vehicles, and more particularly, relates to barrier, wall or partition assemblies which form enclosures inside cargo storage spaces of transport vehicles, and to the methods by which such enclosure assemblies are mounted to and used in such transport vehicles.

BACKGROUND ART

On the order of one-half of the motor vehicles sold in the United States today are trucks or sport utility vehicles (SUVs). In addition, many of these vehicles, as well as many passenger cars, mini-vans and the like, are equipped to tow trailers. Thus, today's consumers generally regard the ability to transport cargo of various descriptions as a highly desired feature.

Trucks, SUVs and trailers all typically include a generally horizontally oriented cargo supporting surface or bed that is surrounded by generally vertically oriented side walls, which together define the cargo space of the transport vehicle. Usually one or more of the side walls is movable to provide better access to the cargo space, and most typically the aft wall or tailgate of the transport vehicle can be lowered to provide such access. Additionally, the cab area of transport vehicles is often used to transport cargo, and particularly smaller sized items.

Cargo box bed liners also are in widespread use as a result of the proliferation of pickup trucks, mini-vans and sport utility vehicles. Such bed liners originally were intended to protect the cargo box of the transport vehicle from being damaged during loading and unloading of cargo. More recently, however, such bed liners have also included structures which enable cargo restraint.

The least complex of such cargo restraining bed liners merely provide non-skid surfaces, such as found in the bed liners of U.S. Pat. Nos. 5,570,921 and 5,803,531. Bed liners also may include tailgate padding panels which are supported by the original equipment tailgate, such as may be found in U.S. Pat. No. 5,722,710.

Restraint or limitation of the lateral movement of cargo within the four walls of a cargo space using cargo restraining bed liners also has been undertaken. Thus, bed liners which are grooved or pocketed and are used with cooperatively formed, plug-in type, cargo restraining members are well known. Typical of such systems are the devices of U.S. Pat. Nos. 5,131,709, 5,549,428, 5,599,055, 5,655,863, 5,673,956, 5,788,309 and 5,788,310. This type of plug-in cargo restraint approach also has even been used on floor mats for automobiles. See, for example, U.S. Pat. No. 4,222,695.

A common problem encountered with plug-in cargo restraining systems is the problem of what to do with the plug-in members when they are not in use. The existence of a multiplicity of unconnected components or parts creates tedious storage and handling problems. The volume required for storage of such plug-in components also can be an issue since they preferably are carried by the transport vehicle when not in use. Moreover, since bed liners were originally developed to protect the cargo area of a vehicle from damage, the grooved or pocketed bed liners themselves can become damaged, with a resultant impairment of areas in the bed liner to which plug-in restraining components can be secured.

Finally, various cargo enclosures or compartments have been designed for use in the cargo areas of transport vehicles. Typically, these structures simply have been placed in the cargo area, and as a result, they often permanently significantly reduce the volume of the cargo space available for cargo which cannot be placed in the compartments. Such prior art storage compartments are illustrated, for example, by the systems of U.S. Pat. Nos. 5,615,922 and 5,685,593.

As used herein, the expression "transport vehicle" shall include motor vehicles, such as pickups, SUVs, vans, automobiles, buses, commercial trucks, watercraft, aircraft, trains, even golf carts, and equivalent motored vehicles used to transport cargo, as well as towed or unpowered cargo carriers, such as trailers and barges and equivalent unpowered vehicles used to transport cargo.

Accordingly, it is an object of the present invention to provide a cargo restraining enclosure assembly and method for use in a transport vehicle, and a transport vehicle employing the same, in which movable cargo restraining sidewalls are provided that can be easily stowed in the cargo space in a compact configuration and easily deployed to form a walled enclosure interiorly of the cargo space defining sidewalls.

It is a further object of the present invention to provide a stowable cargo restraining enclosure assembly and method for a transport vehicle which can be readily installed in the vehicle as an after-market product.

Another object of the present invention is to provide a stowable cargo restraining enclosure assembly which has fewer components and is easier to store and use than conventional transport vehicle cargo enclosures.

Still another object of the present invention is to provide a cargo restraining enclosure assembly and method which will not impede cargo loading or unloading, is durable and is relatively inexpensive to construct.

The stowable transport vehicle enclosure assembly, vehicle and method of the present invention have other objects and features which will become apparent from, or are described in more detail in, the following description of the Best Mode of Carrying Out the Invention and the accompanying drawing.

DISCLOSURE OF THE INVENTION

The present invention provides a stowable cargo restraining enclosure assembly, a transport vehicle having such enclosure assembly, and a method for its use.

The stowable enclosure assembly most preferably is incorporated into a bed liner structure for a cargo space or cargo box of a transport vehicle. The enclosure includes a securement structure, such as the bed liner, and a cargo restraining enclosure assembly mounted thereto. Preferably, the enclosure assembly includes at least one, and most preferably a plurality, of sidewalls which are movable into and out of an enclosure assembly storage cavity in the bed liner. The sidewalls pivot up and out of the bed liner storage cavity and into the cargo space to form a walled perimeter or enclosure which can be used to limit movement of cargo in the cargo space.

In one embodiment, the enclosure assembly is open topped, while in another a lid, cover or top is provided. If desired, the bed liner structure may be eliminated, and the enclosure assembly mounted directly to the cargo bed of the transport vehicle.

The method of the present invention comprises, briefly, the steps of mounting an enclosure assembly to the transport vehicle proximate the cargo space, selectively moving the enclosure assembly between a stowed position and a deployed position, and securing the enclosure in the deployed position limiting movement of cargo. Most preferably, the mounting step is accomplished by mounting a bed liner structure in the cargo space of the vehicle, with the bed liner carrying an enclosure assembly stowed in a storage cavity in a collapsed condition. The moving step is accomplished by pivoting a plurality of sidewalls up and out the storage cavity to a deployed position in which they cooperate and/or are coupled together to provide a walled enclosure in which cargo can be positioned.

BRIEF DESCRIPTION OF THE DRAWINGS

FIG. 1 is a fragmentary, top perspective view of a schematic representation of a stowable cargo restraining enclosure assembly constructed according to the present invention and mounted on the floor of a cab of a transport vehicle;

FIG. 2 is a top perspective view of the cargo restraining enclosure assembly of FIG. 1 removed from the transport vehicle and showing two of the enclosure sidewalls in a stowed position and two remaining enclosure sidewalls in an upright deployed position;

FIG. 3 is a top perspective view of the cargo restraining enclosure assembly of FIGS. 1 and 2 shown in a fully stowed position;

FIG. 4 is an enlarged, side elevation view, in cross section, of the enclosure assembly taken substantially along the plane of line 4—4 in FIG. 1;

FIG. 5 is a top perspective view of an alternative embodiment of the cargo restraining enclosure assembly mounted to a bed liner in a pickup truck with the enclosures in a stowed position.

FIG. 6A is a top perspective view of still a further alternative embodiment of the present cargo restraining enclosure assembly mounted to a bed liner in a pickup truck and shown with the enclosure in a fully deployed position;

FIG. 6B is a top perspective view of the bed liner of FIG. 6A removed from the truck with the enclosure assembly in the process of being stowed;

FIG. 6C is a top perspective view corresponding to FIG. 6B with the enclosure assembly further along in the process of being stowed;

FIG. 6D is a top perspective view corresponding to FIG. 6B with the enclosure assembly fully stowed;

FIG. 7A is an enlarged, fragmentary side elevation view, in cross section, of the enclosure assembly in the position shown in FIG. 6A, taken substantially along the plane of line 7A—7A in FIG. 6A;

FIG. 7B is an enlarged, fragmentary side elevation view, in cross section of the enclosure assembly in the position shown in FIG. 6B, taken substantially along the plane of line 7B—7B in FIG. 6B;

FIG. 7C is an enlarged, fragmentary and elevation view, in cross section, of the enclosure assembly in the position shown in FIG. 6C, taken substantially along the plane of line 7C—7C in FIG. 6C; and FIG. 7D is an enlarged, fragmentary end elevation view, in cross section, of the enclosure assembly in the position shown in FIG. 6D, taken substantially along the plane of line 7D—7D in FIG. 6D.

BEST MODE OF CARRYING OUT THE INVENTION

The stowable cargo restraining enclosure assembly of the present invention is particularly well suited for retrofitting applications in which a transport vehicle's cargo space is provided with a cargo restraining capacity merely by mounting a bed liner in the cargo space. The bed liner includes at least one selectively stowable and deployable enclosure assembly which preferably, but not necessarily, takes the form of a four walled enclosure that can be deployed out of the bed liner to provide a walled enclosure, usually but not necessarily, inwardly of the walls defining the cargo space of the transport vehicle.

FIG. 1 depicts a stowable cargo restraining enclosure assembly 10, according to the present invention, in a deployed position used to store cargo. In this position, enclosure assembly 10 may be used to secure cargo 20 within the interior of a cargo space 30 of a cargo transport vehicle, shown generally as 40. In the installation shown in FIG. 1, enclosure assembly 10 is placed on floorboard 50 of the front passenger region or cab of the vehicle 40, shown here as an automobile, or perhaps a truck or SUV. By contrast, when not in use, enclosure assembly 10 may be collapsed into a stowed position, as shown in FIG. 3, in a bed liner structure, generally designated 70, to which it is advantageously mounted. Thus, in the stowed position, the enclosure assembly 10 essentially becomes a thin liner 70 in cargo storage area 30, and it takes up very little space. However, in the upright position, enclosure assembly 10 becomes a walled enclosure which can act as a restraint against undesired lateral movement of cargo 20.

In the embodiment shown, enclosure assembly 10 need not be permanently installed within or on transport vehicle 40. Thus, enclosure assembly 10 preferably is fabricated on a baseplate or bed liner structure 70 that may be sized to fit in an anticipated installation region. In the embodiment shown, bed liner 70 preferably is sized and shaped to fit within the front passenger floor area of the vehicle cab, but other locations are possible and described in more detail below.

In FIG. 1, it will be seen that the enclosure assembly preferably includes at least one, and most commonly a plurality, of sidewalls. Here, sidewalls 80A, 80B, 90A, 90B move from a near horizontal stowed position to an upright, substantially 90° orientation to the plane of bed liner structure 70. The sidewalls together define an open topped rectangular enclosure whose interior may be used to secure one or more pieces of cargo 20. While as illustrated sidewalls 80A, 80B, 90A, 90B are abutting at their side edges, it will be understood that gaps between the sidewalls could also be present and the sidewalls would still combine to provide a walled enclosure capable of restraining cargo 20 against lateral motion. Encircling and containment of cargo piece 20 also could be accomplished if enclosure sidewalls 80A, 80B, 90A, 90B were at an angle other than 90° to bed liner 70.

Moreover, while sidewalls 80A, 80B, 90A, 90B are planar, it will be understood that they could be arcuate to form a substantially circular walled enclosure when deployed. Arcuate walls, however, generally will be more difficult to stow in a thin bed liner structure, and for that reason planar sidewalls are preferred. More or less than four walls could be employed, and rather than forming an enclosure interiorly of the sidewalls defining cargo space 30, enclosure assembly 10 also could deploy sidewalls in a manner cooperating with the cargo space sidewalls to form an enclosure.

Referring now to FIGS. 2 and 3, opposing first and second spaced-apart sidewalls 80A, 80B preferably have substantially equal heights H1, H2, and opposing third and fourth spaced-apart sidewalls 90A, 90B have substantially equal heights H3. The various sidewalls 80A, 80B, 90A, 90B preferably are hingedly attached at their base regions by recessed hinges to bed liner structure 70. Hinges for sidewalls 80A, 80B are denoted generally as 100, while hinges for sidewalls 90A, 90B are denoted generally as 110 (see FIG. 4). Without limitation, hinges 100 and/or 110 may join the sidewall members being hinged to bed liner 70 over the full length of the sidewall members, or over some fraction of the length. Hinge mechanisms are well understood in the relevant art and for that reasons no further detailed description will be given here.

Suffice to state, however, that the hinges permit the sidewall members to be moved between the stowed and deployed positions by pivoting up out of bed liner 70 and back into enclosure storage cavity 125.

As best may be seen in FIGS. 2 and 4, one pair of sidewalls is hinged to bed liner structure 70 at first height or depth, while the second pair of sidewalls is hinged to the bed liner at a second depth in the bed liner below hinges 100. Thus, sidewalls 80A, 80B are hinged at 100 proximate top surface 85 of the bed liner while sidewalls 90A and 90B are hinged to the bed liner by hinges 110 located below hinges 100.

In order to releasably latch enclosure assembly 10 in a deployed position, the inside surfaces of sidewalls 80A, 80B can be formed with a latch-receiving recess 120 (FIGS. 2 and 4). As will be described, recesses 120 cooperate matingly with a movable latch element 130, which is reciprocally mounted within sidewalls 90A, 90B.

Further, at least one and preferably each of a pair of spaced-apart sidewalls, will include an access structure 140, preferably an opening, permitting a finger to be inserted to lift the sidewall upright from the stowed, substantially horizontal, position to the deployed substantially vertical position.

In FIG. 2, third and fourth spaced-apart sidewalls 90A, 90B are shown in a stowed disposition, which means they have been pivoted downward (as indicated by the curved arrows 95). In FIG. 3, first and second spaced-apart sidewalls 80A, 80B have also been rotated or pivoted about their hinge mechanisms 100, to overlie members 90A, 90B.

In the embodiment shown, bed liner structure 70 is formed with a rectangular enclosure assembly storage cavity 125, and the bed liner sides defining the cavity or recess preferably have a length at least equal to the combined length of sidewalls 80A and 80B and approximately the combined length of sidewall 90A and 90B. In this embodiment, sidewalls 90A, 90B essentially lie upon the underlying portion of floorboard 50 or a lower wall (not shown) defining the bottom of cavity 125. Sidewalls 80A, 80B then overlie sidewalls 90A, 90B. It will be appreciated that the thickness T1 (FIG. 2) of bed liner 70 will preferably be approximate but not less than the sum of the thickness of the folded sidewalls, that is the thickness of sidewall 80A plus sidewall 90A (or 80B plus 90B).

It also would be possible to have each sidewall 80A, 80B, 90A and 90B have a height equal to the length of the opposed liner sides between which they pivot. In such an arrangement, the sidewalls would be hinged at four different levels in the bed liner so that the sides would be raised one at a time from superimposed relation in cavity 125 to the deployed position. The thickness of bed liner T would then have to equal the combined thickness of four full length sidewalls.

It will be appreciated from FIG. 3 that in its collapsed position, cargo restraining enclosure assembly 10 presents a substantially flush surface when stowed. As such, a person sitting in the front passenger seat of vehicle 40 is not inconvenienced by the presence of the thin bed liner structure 70, and indeed, may not even be aware that enclosure assembly 10 is present. On the other hand, when it is desired to use the cargo enclosure, a finger may be inserted through openings 140 in members 80A, 80B and these members may be hinged upwardly until they are about perpendicular to the plane of the bed liner. At this juncture, members 90A, 90B are plainly visible and accessible. A finger may be inserted through openings 140 in these members and they too may be pivoted upwardly until they are about perpendicular to the plane of bed liner 70.

Once deployed, the sidewalls may be releasably latched together. FIG. 4 depicts a preferred implementation to releasably latch the sidewalls when the enclosure assembly is deployed for storing cargo. In the embodiment shown, sidewall 90A (and 90B) each have at least one cylindrical recess 150 receiving reciprocally mounted latch element 160 and a spring 170. Collectively, recess 150, latch member 160, and spring 170 provide a latch mechanism 130.

Springs 170 urge the distal tip portion of each latch member 160 outward. Not shown for ease of illustration in FIG. 4 is a retaining collar, or other structure, which prevents member 160 from coming completely out of recess 150. It will be appreciated that when all four sidewalls are essentially in an upright position, the distal tip of latch member 160 will project into a mating opening 120. It also will be appreciated that a given sidewall might, if desired, be formed with one recess 120 and one latch mechanism 130, or with multiple recesses, or multiple latch mechanisms. A manually engageable member (not shown) can extend outwardly from latch member 160 through a slot (not shown) in sidewalls 90A, 90B for release or reciprocation of member 160 back against spring 170. Alternatively, latch element 160 can merely project into recess 120 by a sufficiently small distance that the user can simply overcome spring 170 by pivoting sidewalls 90A, 90B back toward the stowed position, with the rounded ends of latch members 160 urging the latch member inwardly against the spring. Other latch or detent assemblies could be employed, and the sidewalls could be spring-biased to a deployed position and latched in the stowed position.

FIG. 5 shows an alternative embodiment of the cargo restraining enclosure assembly of the present invention in which multiple enclosures, here designated 10 and 10', are mounted within a common bed liner structure 70'. If desired, more than two such deployable enclosures may be present, and each enclosure could be differently sized with a different number of sidewalls. Bed liner structure 70' shown in FIG. 5 is mounted on the cargo bed 50' of a pickup truck type transport vehicle 40. It also would be possible for the enclosure assembly of the present invention to be mounted directly to bed 50' as original equipment by a securement structure (for example, by hinges 100, 110 secured to bed 50' or to a storage cavity in bed 50').

The various sidewalls 80A, 80B, 90A, 90B may be constructed from material appropriate for the cargo to be stowed. In heavy duty installations, the various sidewalls may be formed from metal, aluminum or steel perhaps, whereas in other installations the sidewalls might be formed from a composite plastic, perhaps overcoated with metal to provide surface protection. The dimensions for enclosure assembly 10 similarly can vary according to the size of the cargo to be stowed. Typical dimensions might be 60 cm×90 cm, although greater or lesser dimensions and aspect ratios could instead be used. Sidewall thickness may be a function of the sidewall material, and typical thicknesses may be 10 mm or greater.

In FIG. 6A to 7D, a further alternative embodiment of the cargo restraining enclosure assembly of the present invention is shown in which the enclosure assembly, generally designated 110, includes foldable sidewalls and a lid or covered top. Enclosure assembly 110 is used to secure cargo within a cargo space 30 of a transport vehicle, shown generally as 40. In the installation shown in FIG. 6A, enclosure assembly 110 is shown as incorporated into a bed liner structure 170 placed, or otherwise positioned, on bed 150 of the rear of a pickup truck. Enclosure assembly 110 is constructed so that it may be moved between the fully deployed position of FIG. 6A to a fully stowed position as shown in FIG. 6D. Thus, in the stowed position, the enclosure assembly essentially lies flat as a thin bed liner in cargo storage area 30. It will be appreciated from FIG. 6D that cargo space 30 will be available for normal use, including transportation of cargo that does not require securing with enclosure assembly 110. However, in the deployed position of FIG. 6A, enclosure assembly 110 becomes an effective barrier against undesired lateral and vertical movement of the cargo.

In FIG. 6A, it is seen that enclosure 110 includes first and second spaced-apart sidewalls 180A, 180B, second and third spaced-apart sidewalls 190A, 190B, and a lid or top portion 185. Preferably, lid 185 includes at least one hand-held structure 240, which preferably is simply one or more cutouts, to facilitate hand-lifting the lid and the entire enclosure assembly 110 to the deployed position. If desired, one or more of the sidewalls comprising enclosure 110 may include perforations 195 enabling enclosure assembly 110 to be used to transport living cargo, a pet for example.

As shown in FIG. 6D, sidewalls 180A and 180B preferably each include a hinges 100A, 100B that permits these sidewalls to be folded inwardly when collapsing the sidewalls into the stowed configuration shown in FIG. 6D. (See also, FIG. 6C in which the enclosure is shown partially collapsed and sidewalls 180A, 180B partially folded.) Hinges 100A, 100B may, but need not be, piano-type hinges disposed lengthwise and parallel to the base of sidewalls 180A, 180B. Preferably, the hinges are located approximately half-way up the vertical dimension of sidewalls 180A, 180B, as measured when these sidewalls are disposed as shown in FIG. 6A.

It will be seen that when fully deployed, sidewalls 180A, 180B and sidewalls 190A, 190B, together define a walled perimeter of a substantially rectangular enclosure. Other polygonal and/or arcuate enclosures could be formed by the sidewalls of enclosure assembly 110.

The thickness dimension "T" of bed liner structure 170 (FIG. 6B) is such that an assembly storage cavity 225 in the bed liner will accommodate the double thickness of folded, collapsed sidewall 180A (or 180B) plus the thickness of sidewalls 190A and 190B, plus the thickness of cap or lid 185, as best may be seen in FIG. 7D. Understandably, thickness, T, which may in fact penetrate the entire thickness of bed liner 170, should at least equal the height "H" (FIG. 6B) of the lid side flange 115 of lid 185 to ensure a flush positioning of the enclosure assembly with the top surface of bed liner 170 when collapsed.

As best seen in FIG. 7D, at least a portion of the bottom edge of sidewall members 180A, 180B are attached by hinge or pivot coupling 121A, 121B to a bottom portion of bed liner 170. Pivots 121A, 121B permit the bottom edges of sidewalls 180A, 180B to remain connected to the bed liner in all sidewall moved positions. Hinges or pivots 131A, 131B connect at least a portion of the upper edge of sidewall members 180A, 180B to a portion of lid member 185. Thus, in FIG. 6D or 7D, when lid member 185 is lifted, for example by inserting a user's finger tips into openings 240, pivots 131A, 131B cause the upper edge of sidewall members 180A, 180B to also lift, whereupon pivots 100A, 100B allow unfolding of these two sidewalls.

Those skilled in the mechanical arts will recognize that the various other hinge or pivot arrangements may be used to implement folding and unfolding of enclosure sidewalls during movement of the enclosure assembly between the deployed and stowed positions.

As shown by FIGS. 6A and 6B, when first sidewall 190A is in an upright position its inner surface contacts an outer vertical edge of sidewalls 180A and 180B, which gives rigidity to the deployed assembly. However, when enclosure 110 is folded or stowed away, sidewall 190A preferably is pivoted upwardly about a sidewall projection 145 (FIGS. 7A, 7C) that is slidably and rotatably mounted in a longitudinally extending channel or groove 142 formed in lid member 185. This upward pivot-like movement is shown by the double arrow 148 in FIG. 7A. In FIG. 7B, another double arrow 149 depicts the horizontal, sliding, telescopic movement by which sidewall 190A is stored horizontally within cap member 185. The mating relationship of ears or projections 145 in channel 142 also can be seen in FIG. 7C. Projections 145 may be cylindrical in shape and need not project more than perhaps 4 mm outwardly from the edge of sidewall 190A.

As best seen in FIGS. 7A and 7B, the bottom of sidewall 190A preferably includes a telescoping assembly 151. Because sidewall 190A preferably is pivoted from the top for storage, it is desired that the bottom of this sidewall not extend into rectangular opening 125 as it would tend to trap the sidewall against upward pivoting. Thus, a telescoping assembly 151 is attached to the bottom portion of sidewall 190A and includes a sidewall extension 155 that is attached by a collar or other slide member 160 to the bottom portion of sidewall 190A. As such, extension 155 can slide up or down along the length of sidewall 190A, but preferably is limited in its travel by stops or shoulders 157 formed on, or attached to, sidewall 190A.

Thus, when sidewall 190A is upright in a vertical position substantially normal to the plane of bed liner 170, telescoping section 151 slides (or is slid) downward until the bottom edge of sidewall extension 155 contacts the bottom surface of the rectangular enclosure storage cavity in the bed liner. However, when enclosure assembly 110 is to be stowed, member 155 is slid vertically upward long sidewall 190A until the bottom edge of sidewall extension 155 clears rectangular opening 125. Sidewall 190A (and extension 151) can now be pivoted upwardly, going from the vertical position shown in FIG. 7A to the horizontal position shown in FIG. 7B. Once in the position shown in FIG. 7B, sidewall 190A is slid horizontally leftward (in FIG. 7B) until it is completely within cap member 185. FIG. 6B shows sidewall 190A nearly totally telescoped into lid member 185 for stowing. If desired, an additional pair of projections, such as projections 145, could be disposed near stop shoulders 157 to support the lower end of sidewall 190A in the groove 142 for storing in the position shown in FIG. 7B.

Enclosure assembly 110 could be constructed such that sidewall 190B was formed and stowed similarly to sidewall 190A. However, in the embodiment shown in FIG. 6B, sidewall 190B simply moves inwardly about a hinge or pivot 184 located at the upper edges of sidewall 190B. As so attached, the vertical length of sidewall 190B can be longer than the length of sidewall 190A. This upward pivoting movement of sidewall 190B is depicted in FIG. 7B by the double arrow 186. Pivot 184 can be as simple as a pair of cylinder-like members that project outwardly perhaps 4 mm or so into receiving pockets in lid 185. Of course, other pivot or hinge structures can be used for either sidewall 190A, 190B.

Preferably, the lower portion of sidewall 190B includes a slidebar-type latch 191 that is user-activated via a vertical slot 200 formed in sidewall 190B. Latch 191 can be slid up or down, and when slid down, the distal tip of latch 191 will be matingly retained in a hole 210 provided in the floor panel of storage cavity 225 of the bed liner. When sidewall 190B is vertically upright, latch 191 is slid downward to cause mating between latch member 191 and hole 210, to help secure sidewall 190B in place. Of course, other such mechanisms could instead be used. A similar latch (not shown) can be used to latch sidewall 190B into groove 141, by, for example extending a latch member laterally outwardly of an edge of sidewall 190B into groove 141. Alternatively, lower sidewall 190B can simply be retained in place by the inwardly folding sidewalls 180A, 180B.

FIG. 7C shows enclosure assembly 110 in the process of being collapsed downwardly for stowing in a flush condition to bed liner 170 (as shown in FIG. 6D), or in the process of being raised vertically to a deployed position (as shown in FIG. 6A). From the foregoing description, it will be appreciated that spaced-apart sidewalls 190A, 190B may be stowed or stored horizontally within lid 185, and that spaced-apart sidewalls 180A, 180B may be folded or collapsed inwardly for stowing. These movements are shown by the various double arrows in FIG. 7C.

When used to restrain movement of cargo within the enclosure defined by sidewalls 180A, 180B, 190A, 190B, and lid 185, access to the interior of the storage compartment or enclosure may be gained through sidewall 190B, but preferably is gained through sidewall 190A. It will be appreciated from FIG. 7B that when access to the storage container is provided through sidewall 190A, sidewall 190A may then be moved to its vertical position without interfering with the cargo positioned within container or enclosure 110.

The various sidewalls and lid assembly of enclosure 110 may be constructed from material appropriate for the cargo to be stowed. In heavy duty installations, the various sidewalls may be formed from metal, aluminum or steel perhaps, whereas in other installations the sidewalls might be formed from a composite plastic, perhaps overcoated with metal to provide surface protection. The dimensions for enclosure assembly 110 similarly can vary according to the size of the cargo to be stowed. Typical dimensions might be 60 cm×90 cm, although greater or lesser dimensions and aspect ratios could be used instead. Sidewall thickness may be a function of the sidewall material. It will be appreciated that although the enclosure embodiment 110 has been described with respect to a bed liner insert structure 170, the bed liner may be eliminated and the enclosure assembly mounted as original equipment to the bed of the transport vehicle, in which a suitable enclosure storage cavity 225 has been formed.

A method of restraining cargo 20 in a cargo space 30 of a transport vehicle 40 also is provided. Broadly the method includes the steps of mounting a bed liner structure 70, 70', 170 in cargo space 30 with the bed liner structure having an enclosure assembly 10, 110 stowed therein, preferably in an enclosure storage cavity 125, 225. The method includes the further step of, after the mounting step, selectively moving the enclosure between a stowed position in the bed liner and a deployed position forming a walled enclosure in cargo space 30. Enclosure assembly 10, 110 preferably includes a plurality of movable sidewalls which, when in the deployed position, together create a perimeter wall or enclosure which can be used to limit cargo movement.

During the moving step hinged sidewalls 180A, 180B can be unfolded, and the enclosure can include a lid 185.

Modifications and variations may be made to the disclosed embodiments without department from the subject and spirit of the invention as defined by the following claims.

What is claimed is:

1. A stowable cargo restraining enclosure for limiting movement of cargo positioned in a cargo space of a transport vehicle comprising:

a bed liner structure having an enclosure assembly storage cavity therein and formed for mounting in a cargo space of a transport vehicle; and a cargo restraining enclosure assembly mounted in said enclosure assembly storage cavity and including a plurality of movable sidewalls each mounted for movement between a stowed position substantially inside said enclosure assembly storage cavity and a deployed position in said cargo space in which said plurality of sidewalls encircle an area of placement of cargo inwardly of walls defining said cargo space to form a walled perimeter in said cargo space limiting movement of cargo.

2. The stowable cargo restraining enclosure as defined in claim 1 wherein, said enclosure assembly includes four substantially planar sidewalls movably mounted to form a generally rectangular enclosure in said deployed position.

3. The stowable cargo restraining enclosure as defined in claim 2 wherein, said bed liner defines said enclosure assembly storage cavity having a rectangular opening at least as large as a piece of said cargo to be restrained, said opening being defined by spaced-apart and opposed first and second bed liner sides substantially orthogonal to spaced-apart and opposed third and fourth bed liner sides;

said enclosure assembly includes spaced-apart first and second sidewalls hingedly secured to said first and second bed liner sides, and spaced-apart third and fourth sidewalls hingedly secured to said third and fourth bed liner sides; and at least one releasable latch device attached to at least one of said sidewalls and formed for maintaining said sidewalls in an upright latched position when said enclosure assembly is in said deployed position.

4. The stowable cargo restraining enclosure as defined in claim 3 wherein, said first and second sidewalls have a combined height not exceeding a length of said third and fourth bed liner sides, and said third and fourth sidewalls having a height not exceeding a length of the first or second bed liner sides.

5. The stowable cargo restraining enclosure as defined in claim 3 wherein, a thickness dimension of said first and second sidewalls combined with a thickness dimension of said third and fourth sidewalls does not exceed a thickness of said bed liner structure.

6. The stowable cargo restraining enclosure as defined in claim 3 wherein,
said sidewalls have at least one characteristic selected from a group comprising of said first and second sidewalls have substantially equal heights, and said third and fourth sidewalls have substantially equal heights.

7. The stowable cargo restraining enclosure as defined in claim 3 wherein,
said at least one releasable latch device is disposed within a thickness of one of said sidewalls.

8. The stowable cargo restraining enclosure as defined in claim 3 wherein,
an upper edge of at least one of said sidewalls defines an opening permitting finger access for lifting of said sidewalls from said stowed position to said deployed position.

9. A stowable cargo restraining enclosure comprising:
a bed liner structure formed for positioning in abutting relation to a portion of a space-defining wall of a cargo space of a transport vehicle, said bed liner structure having a rectangular enclosure storage cavity, said cavity being defined by spaced-apart first and second bed liner sides substantially orthogonal to spaced-apart third and fourth bed liner sides; and
an enclosure assembly including spaced-apart first and second foldable sidewalls each having a bottom edge portion pivotally secured to said first and second bed liner sides, said first and second sidewalls being foldable about an axis parallel to said bottom edge portion, said axis being located approximately mid-height of each of said sidewalls, spaced-apart third and fourth sidewalls being storable in superimposed relation to said first and second sidewalls when said enclosure assembly is in said stowed position, and said third and fourth sidewalls each being sized to fit horizontally within said rectangular storage cavity.

10. The stowable cargo restraining enclosure as defined in claim 9, and
a lid pivotally attached to an upper edge portion of one of said first and second sidewalls, and sized to be positioned over said third and fourth sidewalls in said stowed position.

11. The stowable cargo restraining enclosure assembly as defined in claim 9 wherein,
double a thickness of one of said first and second sidewalls combined with a thickness of said third and fourth sidewalls does not exceed a depth of said storage cavity in said bed liner structure.

12. The stowable cargo restraining enclosure assembly as defined in claim 10 wherein,
at least an upper edge portion of at least one of said third and fourth sidewalls is pivotally attached to said lid.

13. The stowable cargo restraining enclosure assembly as defined in claim 10 wherein,
an inner surface of said lid defines a groove;
an upper edge portion of said third sidewall includes a projection sized to matingly engage and slide within said groove; and
said third sidewall being storable within said lid by sliding said third sidewall into said lid.

14. The stowable cargo restraining enclosure assembly as defined in claim 9 wherein,
said third sidewall includes a movable latch; and
said bed liner structure defines an opening sized to matingly receive a distal portion of said latch when said latch is moved toward said bed liner structure.

15. The stowable cargo restraining enclosure assembly as defined in claim 9 wherein,
said lid is formed with at least one opening providing user access to manually lift said lid and said enclosure assembly to said deployed position.

* * * * *